United States Patent Office 3,586,478
Patented June 22, 1971

3,586,478
SYNTHETIC HECTORITE-TYPE CLAY MINERALS
Barbara Susan Neumann, Surrey, England, assignor to Laporte Industries Limited
No Drawing. Continuation-in-part of application Ser. No. 298,401, June 20, 1963. This application July 5, 1967, Ser. No. 651,107
Claims priority, application Great Britain, June 26, 1962, 24,527/62
Int. Cl. C01b *33/28*
U.S. Cl. 23—111      8 Claims

ABSTRACT OF THE DISCLOSURE

Production of synthetic swelling clays of the type of hectorite by forming an aqueous slurry from
(i) a water soluble magnesium salt
(ii) sodium silicate
(iii) sodium carbonate or sodium hydroxide, and
(iv) material delivering lithium and fluoride ions selected from the group consisting of (A) lithium fluoride and (B) a lithium compound in conjunction with hydrofluoric acid, fluosilicic acid, sodium silico fluoride or sodium fluoride; such that in the slurry the following atomic ratios are present $$\frac{Si}{F}=0.5 \text{ to } 5.1; \quad \frac{Li}{Mg}=0.1 \text{ to } 1.0;$$

$$\frac{Si}{Mg+Li}=0.1 \text{ to } 1.5; \quad \frac{Na}{2\,Mg+F-Li}=1.0 \text{ to } 2.0,$$

the aqueous slurry being formed by co-precipitation by slowly combining the said magnesium salt; the acid sodium silicate; the said sodium carbonate or hydroxide, with heating and agitation, in an aqueous medium which contains the said material delivering the lithium and fluoride ions;

taking the aqueous slurry so formed and without washing it free from soluble salts, hydrothermally treating it for about 10 to 20 hours to crystallise the synthetic mineral-like clay; washing and dewatering the resulting crystallised product and drying the product at a temperature up to 450° C., preferably at 110 to 250° C.

RELATED APPLICATION

This application is a continuation-in-part of application Ser. No. 289,401, filed June 20, 1963 and now abandoned.

BACKGROUND OF THE INVENTION

The invention relates to novel synthetic swelling clay minerals of the type of hectorite and their production.

Most clay minerals, as found naturally, are in an impure state and the complete purification of some is difficult and expensive and, in some cases, impossible. Further, there are occasions on which the supply of a clay mineral having a particular set of chemical and physical properties, either pure or impure, is insufficient. Thus, it is desirable to be able to manufacture synthetic clay-like minerals in a substantially pure form.

It is of particular interest to be able to manufacture synthetic clay-like minerals having rheological properties similar to or better than those of hectorite, as natural hectorite has valuable properties but large quantities of hectorite are not available. In any event natural hectorite is mixed with impurities the removal of at least some of which is extremely difficult.

It is thus highly desirable to be able to synthesise, in a substantially pure state, clays having rheological properties similar to or better than hectorite. However, to my knowledge, only two methods are known for synthesising hectorite-type clay minerals which are capable of yielding more than a few milligrams of product under conditions which are feasible on a commercial scale. One method is described by Granquist and Pollack in Clays and Clay Minerals, Natl. Acad. Sci., Natl. Res. Council Publ. 8. 150—169 (1960), and the other is described by Strese and Hofman in Z. Anorg. Chem. 247, 65–95, (1941).

It is not possible, by either of these methods to obtain products that have good rheological properties. One vital property of a useful swelling clay is characterised by the Bingham Yield Value possessed by an aqueous disperison of the clay. The term Bingham Yield Value (also known as Bingham Yield Stress, these terms being alternatives for precisely the same property) is referred to in such standard works on Rheology as "Rheology Theory and Applications," ed. F. R. Eirich (Acad. Press) vol. 1 (1956), p. 658; "Colloidal Dispersions," L. K. Fischer (N.Y. Bureau of Standards), 2nd Edn. 1953, pps. 150–170, and "The Chemistry and Physics of Clays and Other Ceramic Materials," 3rd Edn., p. 463, A. B. Searle and R. W. Grimshaw. The term may be defined as the shear stress which has to be exceeded before the rate of shear shows a linear relationship to the shear stress, the former being proportional to the difference between the shear stress and the Bingham Yield Value.

The Bingham Yield Value is determined by first obtaining a flow curve relating the shear stress to the rate of shear, and then extra-polating the straight line section of the curve to the shear stress axis; the intercept is the Bingham Yield Value. It can be conveniently determined on any viscometer capable of measuring a range of shear rates and shear stresses. In the experimental work quoted in the present specification a Fann rotation viscometer was used in the manner set out in the book "Oil Well Drilling Technology," by A. W. McCray and F. W. Cole, Union of Oklahoma Press, pp. 94–96 (1958). When measured on this instrument the results are in the unit lbs./100 ft.² However, in this specification the more usual unit of dynes/cm.² will be used. As is well known, to convert lbs./100 sq. ft. to dynes/cm.² a multiplication factor of 4.8 must be used.

The two prior processes produce synthetic swelling clays having, as a 2% dispersion in water, a Bingham Yield Value of only about 15 dynes/cm.,² as is illustrated later in this specification. This is a very low value, inferior to that given by natural hectorite. This is possibly explained in the case of the process described in "Clays and Clay Minerals" by the presence of magnesium hydroxide in the product, and in the case of the process described in "Z. Anorg. Chem.," by incomplete crystallisation of the synthetic clay-like substance and the presence of amorphous silica or silicate and some crystalline silica or quartz.

SUMMARY OF THE INVENTION

It is an object of the present invention to synthesise swelling clays having rheological properties appreciably superior to those of the synthetic products referred to above, and to natural swelling clays, such as hectorite.

It is a further object of the invention to synthesise such swelling clays from readily available chemicals and in a manner capable of being adopted on a commercial scale.

According to the invention a process comprises:
(a) forming an aqueous slurry from
  (i) a water-soluble magnesium salt,
  (ii) sodium silicate,
  (iii) sodium carbonate or sodium hydroxide and
  (iv) material delivering lithium and fluoride ions selected from the group consisting of (A) lithium fluoride and (B) a lithium compound in conjunction with hydrofluoric acid, fluosilicic acid, sodium silicofluoride or sodium fluoride, such that in the slurry the following atomic ratios are present $$\frac{Si}{F} = 0.5 \text{ to } 5.1; \quad \frac{Li}{Mg} = 0.1 \text{ to } 1.0;$$

$$\frac{Si}{Mg+Li} = 0.5 \text{ to } 1.5; \quad \frac{Na}{2\,Mg+F-Li} = 1.0 \text{ to } 2.0,$$

the aqueous slurry being formed by co-precipitation by slowly combining the said magnesium salt and the said sodium silicate and the said sodium carbonate or sodium hydroxide, with heating and agitation, in an aqueous medium which contains the said material or materials delivering the lithium and fluoride ions;

(b) taking the aqueous slurry so formed and, without washing it free from soluble salts, hydrothermally treating it for about 10 to 20 hours to crystallise the synthetic mineral-like clay;

(c) washing and dewatering the resulting crystallised product;

(d) drying the product at a temperature up to 450° C.

DETAILED DESCRIPTION OF THE INVENTION INCLUDING PREFERRED EMBODIMENTS

A preferred process in accordance with the invention comprises the said hydrothermal treatment of the said slurry but in which the slurry has been formed by heating with agitation an aqueous medium containing the lithium, magnesium and fluoride ions, and slowly adding to this medium, (a) An aqueous solution of sodium silicate and then
(b) an aqueous solution containing sodium carbonate. Advantageously the additions (a) and (b) are each conducted over a period of at least 30 minutes, preferably about 1 hour. By increasing this period of time to from 4 to 6 hours it is found that products having the higher Bingham Yield Value (in 2% gel form) can be obtained.

Conveniently the following compounds can be employed in the processes according to the invention: Any suitable water-soluble magnesium salt, for example $$MgCl_2.6H_2O$$

or $Mg(NO_3)_2.6H_2O$, or $MgSO_4.7HO$ for $Mg^{++}$, $Li_2CO_3$ or LiF for $Li^+$; HF acid or LiF, $H_2SiF_6$ or, for example, the sodium salt thereof, for $F^-$; $Na_2CO_3$ NaOH or sodium silicate for $Na^+$, the latter will also provide silicon ions. Conveniently LiF is used as this will provide both $Li^+$ and $F^-$. Clearly however one can employ any lithium compound, including LiOH, together with HF acid and achieve the same result in situ.

Other lithium salts, such as lithium chloride, can also be used to provide the $Li^+$ ion and other fluoride compounds, such as $Na_2SiF_6$ or NaF to provide the $F^-$ ion separately.

Desirably the dilution of the various constituents employed in forming the slurry is such that after the hydrothermal treatment the product is present (calculated as dry wt. free of soluble salts) in quantity of 1–8%, preferably 4% by weight. Having washed and dewatered the product (step C), a preferred temperature range for the final drying step (d) is 110° C. to 250° C. Besides rendering the product in a form which is conveniently stored and transported, the purpose of the final drying step is to develop the rheological properties the clay will possess in aqueous dispersion.

Preferably the slurry will provide an atomic ratio of

Si/F of 0.5 to 4.0 and of $$\frac{Na}{2\,Mg+F-Li} \text{ of } 1 \text{ to } 1.3$$

Conveniently the hydrothermal treatment comprises boiling, with agitation, under reflux at atmospheric pressure. This constitutes a very useful advantage of the process since working at superatmospheric or sub-atmospheric pressure always complicates a process, although if desired can be used in the present process.

The criterion sought is that the hydrothermal treatment, however conducted, is prolonged for a sufficient period such that a sample of the product then existing will (on first being filtered, washed and dried at 110° C. to constant weight) form a gel upon being redispersed in water at 5% solids content. Normally, however, conducted, the hydrothermal treatment will require at least about 10 to 20 hours. As the inevitable result of this hydrothermal treatment of the aqueous slurry, the final product will contain some hydroxyl ion and thus in the general formula quoted hereafter the value "y" will always be less than 4.

Three features of the process according to the invention merit particular attention. All are critical and all contribute to the success of the process as a commercially operable process and as a means of producing hitherto unobtainable, but commercially desirable, products.

The first feature is that it is only necessary to take readily and immediately "shelf-available" chemicals. The process does not require freshly and carefully prepared starting materials, such as are required in the process described in pages 151 and 152 of the "Clays and Clay Minerals" article.

Secondly, the process requires a straightforward co-precipitation step with the alkali and the fluoride ion present during co-precipitation and subsequent hydrothermal treatment. This is a much simpler process than that in "Clays and Clay Minerals," which requires the preparation of gelatinous precipitates, careful washing of these to remove electrolytes combining these materials and then a final alkali addition. Co-precipitation is critical to the present process, as is the presence of alkali and fluoride during co-precipitation. This will be illustrated in the examples hereafter.

Thirdly, the process does not require special precaution against extraneous ions. Indeed it is not critical to the process that the co-precipitated slurry be washed free from certain cations and/or anions before hydrothermal treatment. In fact substantial washing at this stage results in a product of inferior Bingham Yield Value and surface area, and accordingly it is necessary to avoid washing the slurry free from soluble salts. This is illustrated in Ex. 9 hereafter. Thus the process of this invention has the great simplification that the co-precipitated slurry can be immediately hydrothermally treated as it stands. This is in complete contrast to the essential washing procedures described on pages 151, 152 and 167 of the "Clays and Clay Minerals" article and page 68 of the article in Z. Anorg. Chem.

To the synthetic clay minerals of the invention can be ascribed a general structural formula in the same way as natural clay minerals and their X-ray diffraction pattern will resemble those expected of natural clay minerals of similar general formula. This is discussed in various works, for example, in the "X-ray identification and crystal structure of clay minerals," Mineralogical Society (G. Brown) 1961.

The clay-like minerals provided by the invention have the structural formula $$(Si_8\ Mg_{6-x}\ Li_x \cdot O_{20} \cdot (OH)_{4-y}\ F_y)^{x(-)} \cdot \frac{x}{n} M^{n(+)}$$

in which x is between zero and six, y is from 1 up to but excluding 4, M is a cation. Suitably y is at least 1.5. The products have a surface area of from about 200 m.²/g. to about 500 m.²/g. and a cation exchange capacity of from 50 milliequivalents per 100 g. to 120 meq./100 g. In addition, when the cation is $Na^+$ or $Li^+$ the products are synthetic swelling clays having, as a 2% dispersion in tap water, a Bingham Yield Value of at least 40 dynes/cm.², normally up to about 250 dynes/cm.². For one clay x is 0.53, y is 2 and $M^+$ is $Na^+$. Other clays have $M^+=Na^+$ and (i) $x=0.48$; $y=1.5$; (ii) $x=0.57$; $y=2.77$;

(iii) $x=0.35$; $y=1.7$; (iv) $x=0.59$; $y=2.58$. In any of these, and in general, Li+ can replace Na+.

Unduly high cation exchange capacity is undesirable as this indicates that the product is of micro-crystalline nature and this adversely affects the swelling potential of the product. Similarly, a surface area in excess of 500 m.²/g. indicates the presence of an appreciable amorphous content in the product, and this again adversely affects the swelling potential. Thus there is the problem of holding these two properties within acceptable limits whilst increasing the swelling ability of the product. It will be noted that this invention has solved this problem.

The critical nature that the fluoride content plays in the characteristics of the products of the invention can be seen from the following table.

| Value of Si/F in starting material | Value of "y" in formula of product | Bingham Yield Value of a 2% dispersion of product in tap water, dynes/cm.² |
| --- | --- | --- |
| 12.0 | 0.3 | Nil |
| 6.0 | 0.8 | 3 |
| 5.0 | 1.0 | 15 |
| 2.3 | 2.0 | 50 |
| 0.9 | 3.0 | 140 |
| 0.6 | 3.5 | 40 |

Thus only when $y$ is between 1 and 4 do the synthetic clay-like minerals have any appreciable swelling potential.

The products referred to in the Z. Anorg. Chem. reference are not fluoride-containing and in any event do not have a Bingham Yield Value potential of above 15 dynes/cm.². Experiments conducted in accordance with the process described in that article failed to produce any swelling product at all. It is again to be noted that the steps of the process of the present invention are vastly different from the steps indicated in the said article. The products referred to in "Clays and Clay Minerals" are, in the main, free from fluoride and do not have any appreciable swelling capacity. The two products referred to on page 154 of the article are the only fluoride-containing ones mentioned. However, these two correspond respectively to Si/F ratios of 5.4 and 12.1, i.e. F⁻ is expected to be about 0.7 and 0.3 respectively. The chemical analysis of the first one of these products quoted on page 158 shows that F⁻ is, in fact, 0.6.

From the above table it is clear that the products have no appreciable Bingham Yield Value potential, and certainly substantially below that of products in accordance with this invention.

The following examples illustrate aspects of the invention, but do not in any way limit the scope of the invention.

Examples 1 to 6 illustrate syntheses of products in accordance with the invention.

Example 7 illustrates a process carried out in accordance with the teaching in the "Clays and Clay Minerals" article.

Examples 8 and 9 illustrate the essential nature of certain steps in the process according to the invention.

Examples 10 and 11 illustrate two uses for products of the invention.

EXAMPLE 1

14.5 g. lithium fluoride was placed in a flask of about 5 litre capacity fitted with a stirrer, a heating mantle and a refluxing condenser. In a separate vessel 228 g. magnesium chloride hexahydrate was dissolved in 1.5 litres of water and the solution added to the lithium fluoride. The mixture was brought to the boil under reflux while stirring efficiently.

In a separate vessel 309 g. sodium silicate solution containing 29 g. SiO₂ and 8.8 g. Na₂O per 100 g. was diluted with 1.5 litres of water. This was added slowly to the reaction vessel containing the LiF and MgCl₂ solution. The addition was made over a period of about one hour, while the reaction mixture was kept boiling and stirred efficiently throughout.

A solution of 72 g. anhydrous sodium carbonate in 1.1 litres of water was then made up and this was also added slowly, over a period of about one hour, to the reaction mixture.

The mixture was then boiled under reflux, with efficient stirring for about 20 hours. After that, it was filtered under vacuum and washed by filtering 9 litres of water through the filter cake. Finally the filter cake was dried in trays at 130° C. and ground in a small mill.

The finished product was tested by X-ray analysis and was found to have the same X-ray pattern as hectorite. It had a cation exchange capacity of 70 meq./100 g., and a surface area of 490 m.²/g.

When 2 g. was dispersed in 100 ml. hot water, it was found that, after cooling, a clear thixotropic gel was obtained. The gel was heat stable and not flocculated by electrolytes even when added in appreciable quantity. By using a rotational (Fann) viscometer, the following rheological parameters were measured on this dispersion:
Plastic viscosity: 13.5 centipoises
Bingham Yield Value: 103 dynes/cm.²

In this example the atomic ratios of the constituents in the feed are as follows:

$$\frac{Si}{F}=2.7;$$

$$\frac{Li}{Mg}=0.5;$$

$$\frac{Si}{Mg+Li}=0.9;$$

$$\frac{Na}{2\ Mg+F-Li}=1.0.$$

The analysis of the product obtained corresponds to the structural formula

$(Si_8Mg_{5.8}\cdot Li_{0.53}\cdot O_{20}\cdot (OH)_2F_2)^{0.53(-)}\cdot 0.53Na^{(+)}$ The improved rheological properties of this synthetic product can be judged from the fact that, even as a 3% weight dispersion, a commercially available natural hectorite product had a plastic viscosity of only 5.0 centipoises and a Bingham Yield Value of only 33 dynes/cm.².

EXAMPLE 2

In this example the procedure adopted was as for Example 1. However, the quantity of lithium fluoride employed was in this case 11.6 g.

The atomic ratios of the constituents in the feed were thus:

$$\frac{Si}{F}=3.3;$$

$$\frac{Li}{Mg}=0.4;$$

$$\frac{Si}{Mg+Li}=0.95;$$

$$\frac{Na}{2\ Mg+F-Li}=1.0.$$

The chemical analysis of the product corresponds to

$(Si_8Mg_{5.52}Li_{0.48}O_{20}(OH)_{2.5}F_{1.5})^{0.48}-0.48Na^+$

The product obtained had a cation exchange capacity of 52 meq./100 g.; a 2% dispersion in water had a plastic viscosity of 10.0 centipoises and a Bingham Yield Value of 79 dyne/cm.². The surface area of the product was 500 m.²/g.

EXAMPLE 3

296 g. magnesium sulphate heptahydrate was dissolved in 1 litre water and placed in a flask of about 5 litres capacity fitted with a stirrer, a heating mantle and a refluxing condenser. In a separate vessel 26.5 lithium carbonate and 43.2 g. sodium hydroxide were added to 200 ml. water and hydrofluoric acid solution was added to it under continuous stirring, until a neutral reaction was indicated by methyl red indicator. The amount required was approximately 240 ml. of a 15% w./w. hydrofluoric acid solution. The second mixture was then added to the first, and they were brought to the boil under reflux while stirring efficiently.

A separate solution consisting of 332 g. sodium silicate solution of the type referred to in Examples 1 and 2 and 1.6 litre water was then fed slowly into the reaction vessel. The addition was made over a period of about four hours while the reaction mixture was kept boiling and stirred efficiently throughout.

A solution of 76.8 g. anhydrous sodium carbonate in 1.1 litre water was then made up and this was also added slowly, over a period of about four hours, to the reaction mixture.

The mixture was then boiled under reflux, with efficient stirring for 20 hours. After that, it was filtered under vacuum and washed by filtering 9 litres water through the filter cake. Finally the filter cake was dried in trays at 130° C. and ground in a small mill.

The finished product was tested by X-ray analysis and was found to have an X-ray pattern closely resembling hectorite. It had a cation exchange capacity of 90 meq./100 g. and a surface area of 326 m.²/g.

When 2 g. of the product was dispersed in 100 ml. of cold water it was found that a clear thixotropic gel was obtained. The gel was heat stable and unaffected by electrolytes even when added in appreciable quantity. By using a rotational (Fann) viscometer, the following rheological parameters were measured on this dispersion:

Plastic viscosity: 11.5 centipoises
Bingham Yield Value: 210 dynes/cm.².

In this example the atomic ratios of the constituents in the feed are as follows:

$$\frac{Si}{F} = 0.89;$$

$$\frac{Li}{Mg} = 0.6;$$

$$\frac{Si}{Mg+Li} = 0.83;$$

$$\frac{Na}{2\ Mg+F-Li} = 1.0.$$

The analysis of the product obtained corresponds to $$(Si_8Mg_{5.43}Li_{0.57}O_{20}(OH)_{1.23}F_{2.77})^{0.57-}0.57Na^+$$

EXAMPLE 4

In this example the procedure of Example 3 was followed but altering the quantity employed of certain of the constituents. Thus there was employed 5.3 g. of lithium carbonate, 23.2 g. of sodium hydroxide and 96 ml. of 15% HF solution.

These quantities gave rise to the following atomic ratios of constituents in the feed:

$$\frac{Si}{F} = 2.22;$$

$$\frac{Li}{Mg} = 0.12;$$

$$\frac{Si}{Mg+Li} = 1.2;$$

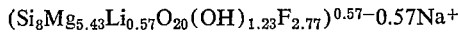

The product had a surface area of 362 m.²/g. and a cation exchange capacity of 71 me./100 g. A dispersion of 2 g. product in 100 ml. hot water, after cooling, gave a clear thixotropic gel having a plastic viscosity of 9 centipoises and a Bingham Yield Value of 62 dyne/cm.².

The chemical analysis of the product obtained corresponds to

EXAMPLE 5

312 g. sodium silicate of the type described in the previous examples was diluted with 1.5 litres water. 55 g. sodium hydroxide and 29.2 g. lithium fluoride were added and the mixture placed in a 5 litres flask fitted with a stirrer, a heating mantle and a refluxing condenser. A separate solution of 278 g. magnesium sulphate heptahydrate in 1.5 litres water was then made up and this was added slowly, over a period of about one hour to the reaction mixture, while it was kept boiling and stirred efficiently throughout.

The atomic ratios of the constituents in the feed were thus:

$$\frac{Si}{F} = 1.35;$$

$$\frac{Li}{Mg} = 1;$$

$$\frac{Si}{Mg+Li} = 0.67;$$

$$\frac{Na}{2\ Mg+F-Li} = 1.0.$$

The mixture was then boiled etc., and treated as in the foregoing examples. The product had a cation exchange capacity=73 meq./100 g. and the said values for plastic viscosity and Bingham Yield Value were 6.3 centipoises and the 58 dynes/cm.² respectively.

The chemical analysis of the product obtained corresponds to

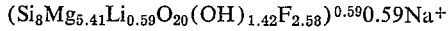

having area of 348 m.²/g.

In general it is found that the higher Bingham Yield Values can be obtained by selecting atomic ratios similar to those of Example 3, with a somewhat higher Na ratio, and employing the preferred solids concentration; addition periods, heating times and temperatures.

EXAMPLE 6

The procedure described in Example 3 was followed, but the washed filter cake was treated before drying by filtering through it a solution of 15 g. lithium chloride in 300 ml. distilled water, followed by washing with 300 ml. distilled water. In this way, the exchangeable Na+ ions were substantially replaced by Li+ ions. All other properties of the product, including the Bingham Yield Value, were found to be virtually unchanged.

EXAMPLE 7

This example illustrates a process carried out in accordance with the teaching of the article in "Clays and Clay Minerals," but using sodium silicate instead of the expensive silicon tetrachloride as one of the starting materials.

182 g. sodium silicate of the type used in Example 1 was diluted with nine times its weight of water and heated to 100° C. 78 g. sulphuric acid of 33% w./w. concentration was added to it under stirring. The resultant gel was allowed to stand for 10 minutes, broken down by stirring, then filtered and washed till substantially sulphate free, with about 1.8 litres water.

164 g. magnesium sulphate heptahydrate was dissolved in 500 ml. water, heated to 1002° C. and precipitated with sodium hydroxide solution of 47% w./w. concentration.

The precipitate was filtered after a few minutes and washed with about 1.2 litre water, until substantially sulphate free. This gelatinous precipitate was very slow filtering and extremely difficult to wash.

The two precipitates were combined by stirring with a high speed stirrer and a solution of lithium fluoride was added. The latter was obtained by adding 6.15 g. lithium carbonate to a solution of 5.55 g. hydrofluoric acid of 60% w./w. concentration in 50 ml. water. Water was then added until the calculated solids content, based on the amounts of $SiO_2$ and $Mg(OH)_2$ present was 10%. The resultant slurry was boiled under continuous stirring and reflux for 24 hours. Finally, without further washing or filtering, the gel-like product was dried and ground, as the products obtained in all other experiments.

The product had a cation exchange capacity of 82 meq./100 g. and the said values for plastic viscosity and Bingham Yield Value were 4.9 centipoises and 15 dyne/cm.² respectively.

The chemical analysis of the product obtained corresponding to the structural formula

and the surface area was 237 m.²/g.

EXAMPLE 8

In this example the synthesis method employed and the materials used were the same as those in Example 1 with the exception that the addition of the sodium carbonate solution was omitted, and was replaced by an equivalent amount of pure water to keep volumes comparable.

The finished product had a cation exchange capacity of 35 meq./100 g. and could not be dispersed to form a gel or a stable, non-settling suspension even when various amounts of sodium carbonate were added to the dispersion medium.

EXAMPLE 9

The precipitation was carried out in the same way as in Example 3. Immediately after precipitation, the product was washed by filtration and redispersed in pure water to obtain a soluble salt-free slurry having the same insoluble solids content as existed before filtration. The slurry was then boiled under reflux with efficient stirring for 20 hours. After that it was filtered under vacuum and dried (no further washing being necessary).

The product had a cation exchange capacity of 63 meq./100 g. and a plastic viscosity of 10.0 centipoises. The Bingham Yield Value was only just over 40 dyne/cm.² which is only just acceptable, but this was offset by the very high surface area of the product, which was almost 550 m.²/g.

EXAMPLE 10

This example illustrates the emulsion-thickening effect of synthetic products compared with that of a well-known commercial purified natural hectorite product.

The comparison was made on polyvinyl acetate emulsions sold by Vinyl Products Limited, under the trade names Vinamul N.8800 and Vinamul N.8107. The rheological properties of these emulsions, namely, plastic viscosities and Bingham Yield Values, were measured in their original states, after mixing with preformed aqueous clay gels having 25% solid content and after dilution with the amounts of pure water shown. Addition of either type of clay material as dry powder to the emulsions or diluted emulsions was found to be ineffective and it was therefore essential to make aqueous gels of them before use for this purpose.

The rheological measurements were done with a rotational (Fann) viscometer. The synthetic clay referred to in the table below was one made according to Example 3.

| Composition (weight percentages) | | | | Added water (inc. water in gel) | Rheological properties | |
|---|---|---|---|---|---|---|
| | | Clay (dry weight basis) | | | Plastic visc. (cp.) | Bingham Yield Value (dynes/cm.²) |
| N.8800 | N.8107 | Synthetic | Natural | | | |
| 100 | 0 | 0 | 0 | 0 | 550 | 96 |
| 95 | 0 | 0 | 0 | 5 | 310 | 130 |
| 95 | 0 | 1.25 | 0 | 3.75 | >1,000 | >48,000 |
| 95 | 0 | 0 | 1.25 | 3.75 | 3.18 | 778 |
| 0 | 100 | 0 | 0 | 0 | 42 | 101 |
| 0 | 90 | 0 | 0 | 10 | 14 | 81.6 |
| 0 | 90 | 2.5 | 0 | 7.5 | 67 | 230 |
| 0 | 90 | 0 | 2.5 | 7.5 | 16 | 48 |

EXAMPLE 11

This example illustrates the value of a synthetic product in accordance with the invention as an aid in the retention of $TiO_2$ in paper. The table shows the clear superiority of the synthetic material in this connection. Again, the synthetic material is then incorporated with the paper-making process—being, suitably added to the beater stock.

| Type of titanium oxide | Retention aid used | Retention aid used calculated on $TiO_2$ | $TiO_2$ present in pulp, calculated | $TiO_2$ in sheets | Retention | Opacity | Brightness |
|---|---|---|---|---|---|---|---|
| Anatase | | | 3.92 | 2.63 | 67.1 | 82 | 95 |
| Do | Synthetic material | 2 | 3.85 | 2.96 | 77.2 | 82 | 95 |
| Do | Natural hectorite product | 2 | 4.48 | 3.12 | 69.7 | 83 | 95 |

¹ On dry weight basis.

I claim:

1. A process for the synthesis of a clay structurally analogous to natural hectorite comprising
   (a) forming an aqueous slurry from
      (i) a water soluble magnesium salt
      (ii) sodium silicate
      (iii) sodium carbonate or sodium hydroxide, and
      (iv) material delivering lithium and fluoride ions selected from the group consisting of (A) lithium fluoride and (B) a lithium compound in conjunction with hydrofluoric acid, fluosilicic acid, sodium silico fluoride or sodium fluoride; such that in the slurry the following atomic ratios are present $$\frac{Si}{F}=0.5 \text{ to } 5.1; \quad \frac{Li}{Mg}=0.1 \text{ to } 1.0;$$

$$\frac{Si}{Mg+Li}=0.5 \text{ to } 1.5; \quad \frac{Na}{2\,Mg+F-Li}=1.0 \text{ to } 2.0;$$

the aqueous slurry being formed by co-precipitation by slowly combining the said magnesium salt; the said sodium silicate; the said sodium carbonate or hydroxide, with heating and agitation, in an aqueous medium which contains the said material delivering the lithium and fluoride ions;
   (b) taking the aqueous slurry so formed and without washing it free from soluble salts, hydrothermally treating it for about 10 to 20 hours to crystallise the synthetic mineral-like clay;
   (c) washing and dewatering the resulting crystallised product;

(d) drying the product at a temperature up to 450° C.

2. A process as claimed in claim 1, such that in the slurry the following atomic ratios are present $$\frac{Si}{Mg+Li}=0.7 \text{ to } 1.2; \quad \frac{Si}{F}=0.5 \text{ to } 4.0;$$

$$\frac{Li}{Mg}=0.1 \text{ to } 1.0; \quad \frac{Na}{2\ Mg+F-Li}=0.1 \text{ to } 1.3.$$

3. A process as claimed in claim 1, wherein the aqueous slurry obtained after hydrothermal reaction is such that the precipitated mineral-like clay (calculated on dry weight free of soluble salts) comprises 1 to 8% by weight thereof.

4. A process as claimed in claim 1, wherein the water-soluble magnesium salt is selected from the group consisting of magnesium sulphate, magnesium chloride and magnesium nitrate.

5. A process as claimed in claim 1, wherein the final drying step (d) is carried out at a temperature between about 110 and 250° C.

6. A process as claimed in claim 1, wherein the said co-precipitation step is conducted over a period of 4 to 6 hours.

7. A synthetic clay-like mineral structurally analogous to hectorite having, as a 2% dispersion in water, a Bingham Yield Value of at least 40 dynes/cm.$^2$ produced by the process of claim 1.

8. A synthetic clay-like mineral structurally analogous to hectorite having, as a 2% dispersion in water, a Bingham Yield Value of at least 40 dynes/cm.$^2$ produced by the process of claim 2.

References Cited

Granquist et al., "Clays and Clay Minerals," Proceedings of the Eighth National Conference on Clays and Clay Minerals, Copyright 1960, pp. 150–169.

EDWARD J. MEROS, Primary Examiner

U.S. Cl. X.R.

23—113; 106—71; 162—181; 252—317